United States Patent [19]

Suzuki

[11] Patent Number: 5,040,665

[45] Date of Patent: Aug. 20, 1991

[54] REMOVING APPARATUS FOR PAPER SHEETS, FOLD SECTIONS, PAPER DUCT, ETC., IN ROTARY PRESS

[75] Inventor: Seiji Suzuki, Yokohama, Japan

[73] Assignee: Tokyo Kikai Seisakusho, Ltd., Tokyo, Japan

[21] Appl. No.: 510,528

[22] Filed: Apr. 18, 1990

[30] Foreign Application Priority Data

Apr. 18, 1989 [JP] Japan .................................... 1-96324
Apr. 26, 1989 [JP] Japan .................................. 1-104631
Jun. 10, 1989 [JP] Japan .............................. 1-67609[U]

[51] Int. Cl.[5] ............................................... B65G 25/00

[52] U.S. Cl. .................................... 198/743; 198/736; 198/550.01; 198/747

[58] Field of Search .............. 198/743, 550.01, 468.01, 198/468.9, 468.11, 717, 736, 737, 738, 741, 747

[56] References Cited

U.S. PATENT DOCUMENTS 605,621 6/1898 Acklin ................................ 198/743
2,381,185 8/1945 Rogers et al. .................. 198/743 X
3,827,549 8/1974 Hunter ............................ 198/747 X

FOREIGN PATENT DOCUMENTS 3504591 8/1986 Fed. Rep. of Germany ...... 198/743
0273411 12/1986 Japan .................................. 198/747
0384757 11/1973 U.S.S.R. ............................ 198/743

*Primary Examiner*—Robert P. Olszewski
*Assistant Examiner*—James R. Bidwell
*Attorney, Agent, or Firm*—Trexler, Bushnell, Giangiorgi & Blackstone, Ltd.

[57] ABSTRACT

Disclosed is a removing apparatus for removing paper sheets, fold sections, paper dust, etc., which is to be disposed in a falling and accumulating region of the paper sheets, fold sections, paper dust, etc., in a rotary press. In this removing apparatus, dust collection of paper dust that falls and accumulates into a hopper below a folding apparatus of a rotary press can be made easily and automatically without stopping the operation of the rotary press, and removal of paper sheets and fold sections, that has been difficult by conventional dust collectors, can be made simultaneously with dust collection described above.

1 Claim, 14 Drawing Sheets

REMOVING APPARATUS FOR PAPER SHEETS, FOLD SECTIONS, PAPER DUCT, ETC., IN ROTARY PRESS

BACKGROUND OF THE INVENTION

1. Field of the invention

In rotary press for printing books, newspapers, and the like, this invention relates particularly to a removing apparatus for removing paper sheets, fold sections, paper dust, etc., that fall and accumulate below a folding apparatus.

2. Description of the Prior Art

According to "Newspaper Printing-Printing Edition", rev. (pp. 104) edited by Japan Newspaper Association, the portions where paper dust occurs in a rotary press are a cut portion of a folding apparatus, a slitter portion and a take-up paper brake belt portion. Among them, great quantities of paper dust occur at the cut portion of the folding apparatus.

An example of the prior art technique for removing such paper dust is "Dust Collection/Suction Head is Folding Apparatus in Rotary Press" disclosed in Japanese Utility Model Publication No. 12403/1979. In this prior art apparatus, a dust collection/suction head for sucking paper dust occurring when printed and travelling paper is cut by blades of the folding apparatus of the rotary press is directly fitted to the paper dust occurring position of the rotary press.

Those paper sheets which fall particularly into a hopper positioned below the folding apparatus due to paper shortage during the paper feed operation at the start of the printing work and those fold sections which fall from a normal flow of the printed sheets are left as such in the hopper together with the paper dust. They are removed at the stop of the rotary press or at the time of maintenance and inspection after the printing work is complete, only after considerable quantities are stored in the hopper. The removal work is carried out by first removing manually large paper sheets and then removing medium size paper sheets with very small dust by a portable vacuum cleaner.

The dust collection/suction head of the prior art technique described above does not impede the travel of printed matters and does not either sacrifice the operation space of the folding apparatus, but its fitting position is markedly limited spatially, and access to the head is extremely dangerous not only during the printing operation but also at the time of maintenance and inspection because the head is disposed at a narrow position around which a folding cylinder or the like is rotating at a high speed.

Moreover, the dust collection/suction head is mainly directed to suck the paper dust and is not therefore much suitable for suction and removal of paper sheets, fold sections, and the like.

The removal work of the paper sheets and the like can be made easily at those portions which permit easy access of hands and the vacuum cleaner but cannot easily be applied to the removal of fold sections and to the removal of the paper sheets and the like staying at the depth of the hopper below the folding apparatus having a narrow space structure. Moreover, it cannot remove completely small paper sheets but leave considerable quantities of paper sheets, and is not free from the problems that when dust collection of paper dust is made, the paper sheets are once adsorbed at the suction port of the vacuum cleaner, they must be removed manually and this is an extremely insufficient work.

SUMMARY OF THE INVENTION

The present invention is directed to eliminate the problems with the prior art technique described above.

The removing apparatus for paper sheets, fold sections, paper dust, etc., in accordance with the first system of the present invention comprises:

(a) a hopper space which defines an upper space portion and a lower space portion and into which the paper sheets, fold sections, paper dust, etc., of the rotary press fall;

(b) a longitudinal grid forming the bottom surface of the upper space;

(c) an upper frame member disposed in the upper space portion and capable of reciprocating in the discharging direction of the paper sheets and the fold sections;

(d) a lower frame disposed in the lower space portion and capable of reciprocating in the discharging direction of the paper dust;

(e) a plurality of hooks disposed on the upper frame member with gaps between them in the reciprocating direction, being rocked by driving means in the reciprocating direction, and having the tip thereof capable of coming close to the upper surface of the longitudinal grid or projecting into the longitudinal grid; and (f) a plurality of scraping plates disposed on the lower frame member with gaps between them in the reciprocating direction, being rocked by driving means in the reciprocating direction and having the tip thereof capable of coming close to, or coming into contact with, the dust collection surface as the bottom surface of the lower space portion.

The removing apparatus for removing paper sheets, fold sections, paper dust, etc., described above is disposed in a falling and accumulating region of the paper sheets, fold sections, paper dust, etc., of the rotary press.

The removing apparatus for paper sheets, paper dust, etc., in accordance with the second system of the present invention comprises;

(a) a hopper space which defines an upper space portion and a lower space portion and into which paper sheets, fold sections and paper dust of the rotary press fall;

(b) a conveyor including a non-gapped endless belt member or a gapped endless belt member as a conveyor belt disposed in the upper space, and driving means for rotating the conveyor belt; and (c) paper dust discharge means as an endless rotary member on which scraping plates facing a descending slope surface or dust collection surface disposed in the lower space are aligned.

The removing apparatus for paper sheets, fold sections, paper dust, etc., is disposed in the falling and accumulating region of the paper sheets, fold sections, paper dust, etc., of the rotary press.

The removing apparatus for paper sheets, fold sections, paper dust, etc., in a rotary press in accordance with the third system of the present invention comprises:

(a) a hopper space into which paper sheets, fold sections, paper dust, etc., of the rotary press fall; and (b) a conveyor consisting of a conveyor belt as a gapped endless belt member onto which scraping plates facing the dust collection surface of the hopper space are aligned, and driving means for rotating the conveyor belt.

The removing apparatus for paper sheets, fold sections, paper dust, etc., is disposed in the falling and accumulating region of the paper sheets, fold sections, paper dust, etc., of the rotary press.

The removing apparatus for paper sheets, fold sections, paper dust, etc., in the fourth system of the present invention comprises:

(a) a hopper space which defines an upper space portion and a lower space portion and into which paper sheets, fold sections, paper dust, etc., of the rotary press fall;

(b) a moving member capable of reciprocating along guides in upstream and downstream directions of the lower space; and (c) a flexible sheet disposed on the bottom surface of the lower space and having the edge thereof on the upstream side fitted to the moving member and the edge thereof on the downstream side fitted to, or near, the bottom surface of the hopper space on the downstream side.

The removing apparatus for paper sheets, fold sections, paper dust, etc., is disposed in a falling and accumulating region of the paper sheets, fold sections, paper dust, etc., of the rotary press.

In the first system described above, the tips of the hooks are near the upper surface of the longitudinal grid or at the original positions where they project into the longitudinal grid before the start of the operation of the removing apparatus, and all the scraping plates are also at their original positions where their tips are close to, or in contact with, the dust collection surface.

Large paper sheets falling from the folding apparatus of the rotary press and fold sections which are not delivered normally from the delivery portion of the folding apparatus but fall therefrom are received by the longitudinal grid and stay there. Similarly, falling small paper dust passes through the grid gaps of the longitudinal grid and accumulates and stays on the dust collection groove surface.

When the removing apparatus is activated, the driving means pushes forth the upper frame member to the advance position and the paper sheets and fold sections staying on the longitudinal grid in the upper space are pushed forward stroke by stroke of the driving means by each of the hooks aligned. In other words, the paper sheets and the like existing in front of one hook are pushed ahead of the original position of the hook immediately before this one hook and the paper sheets and the like existing in front of the foremost position are discharged from the front edge of the longitudinal grid.

In the lower space, on the other hand, the paper dust staying on the dust collection groove is pushed forward simultaneously with the operation described above and stroke by stroke of the driving means by each of a plurality of scraping plates that are aligned. In other words, the paper dust existing in front of one scraping plate is pushed ahead of the original position of the scraping plate immediate ahead of this one scraping plate and the paper dust existing in front of the foremost scraping plate is discharged from the front edge of the dust collection groove.

Thereafter, all the hooks are rotated in the retreating direction by the driving means, and their tips move upward away from the longitudinal grid. In the lower space, too, all the scraping plates are rotated in the retreating direction simultaneously and their tips move upward away from the dust collection groove.

Next, the upper and lower frame members are moved back to their retreat positions by the driving means. In this instance, since the tips of all the hooks and scraping plates are at the upward stand-by positions, they do not affect the movement of the paper sheets, fold sections and paper dust that have previously been pushed forward stroke by stroke of the driving means.

Then, all the hooks are rotated in the advancing direction in the upper space by the driving means and return to their original positions while in the lower space, all the scraping plates are rotated in the advancing direction and their tips return to the original positions where they are close to, or in contact with, the dust collection groove.

Thereafter, since the operations described above are repeated, the paper sheets, the fold sections, paper dust, that stay on the longitudinal grid and on the dust collection groove, respectively, are sequentially pushed forward and are then discharged.

In the second and third systems, the small paper dust and large paper sheets falling from the folding apparatus of the rotary press and the fold sections which are not delivered normally from the delivery portion of the folding apparatus fall onto the conveyor which is rotated by the driving means.

If the conveyor belt is of the gapped endless belt type, the paper sheets and the fold sections are received by the conveyor belt and stay there while the paper dust passes through the gaps of the gapped endless belt and through the peripheral gaps, fall onto, and stay on, the descending slope surface or the bottom of the falling and accumulating region, that is, the dust collection surface, of the endless rotary member on which the scraping plates are aligned.

If the belt conveyor is of the non-gapped endless belt, the paper dust, paper sheets and fold sections are received by and stay on the conveyor belt, and the paper dust falling around the falling and accumulating region passes further through the peripheral gaps and falls onto and stays on the descending slope or on the dust collection surface below the endless rotary member on which the scraping plates are aligned.

The paper sheets and the fold sections staying on the conveyor belt are as such conveyed and discharged by the conveyor belt and the paper dust staying on the descending slope slides down gradually due to the inclination and is discharged. Further, the paper dust staying on the dust collection surface is scraped off and discharged by the line of scraping plates that are rotating.

If the conveyor belt is the gapped endless belt member on which the scraping plates are aligned, the paper sheets and the fold sections are received by the conveyor belt and stay there while the paper dust passes through the gaps of the gapped endless belt member and through the peripheral gaps and falls onto and stay on the dust collection surface.

The paper sheets and the fold sections staying on the conveyor belt are as such conveyed and discharged by the conveyor belt, while the paper dust staying on the dust collection surface is scraped off and discharged by the line of rotating scraping plates in the opposite direction to the paper sheets and to the fold sections.

In the fourth system, the moving member is normally positioned at the upstream end at the start and the flexible sheet is expanded on the bottom surface of the hopper space. The small paper dust and large paper sheets falling from the folding apparatus of the rotary press and furthermore, the fold sections which are not normally discharged from the delivery portion of the folding apparatus and fall therefrom accumulate on the flexible sheet.

When these accumulating paper sheets, fold sections and paper dust are recovered and removed, the removing member moves from the upstream side to the downstream side and the flexible sheet is folded back while wrapping and gathering the accumulating paper sheets, fold sections and paper dust into it.

As the movement of the moving member proceeds, the flexible sheet becomes gradually bag-like and wrapps and gathers the paper sheets, fold sections and paper dust into it on the downstream side. The paper sheets, fold sections and paper dust thus gathered and collected on the flexible sheet at the downstream end can be collected and removed easily by suitable means.

When the recovery and removal work of the paper sheets, fold sections and paper dust is thus complete, the lower moving member moves from the downstream end to the upstream side. Thus, the flexible sheet returns to its original state where it is expanded on the bottom surface of the hopper space.

If the upstream edge of the flexible sheet is fitted to a flexible sheet take-up apparatus of the moving member, the flexible sheet take-up apparatus moves towards the downstream side together with the moving member while taking up the flexible sheet when the moving member moves from the upstream side to the downstream side at the time of recovery and removal of the accumulating paper sheets, fold sections and paper dust.

Accordingly, the paper sheets, fold sections and paper dust accumulating on the flexible sheet are gradually gathered towards the downstream side.

When the moving member moves to the downstream end, the flexible sheet is taken up into the flexible sheet take-up apparatus while slackening, and enters substantially an upright state. Therefore, the paper sheets, fold sections and paper dust reach the downstream end of the bottom surface of the hopper space and if a dust collection bucket is disposed, they are discharged into the dust collection bucket.

These and other objects and novel features of the present invention will become more apparent from the following description when taken in connection with the accompanying drawings.

DESCRIPTION OF THE PREFERRED EMBODIMENTS

Figure 1:
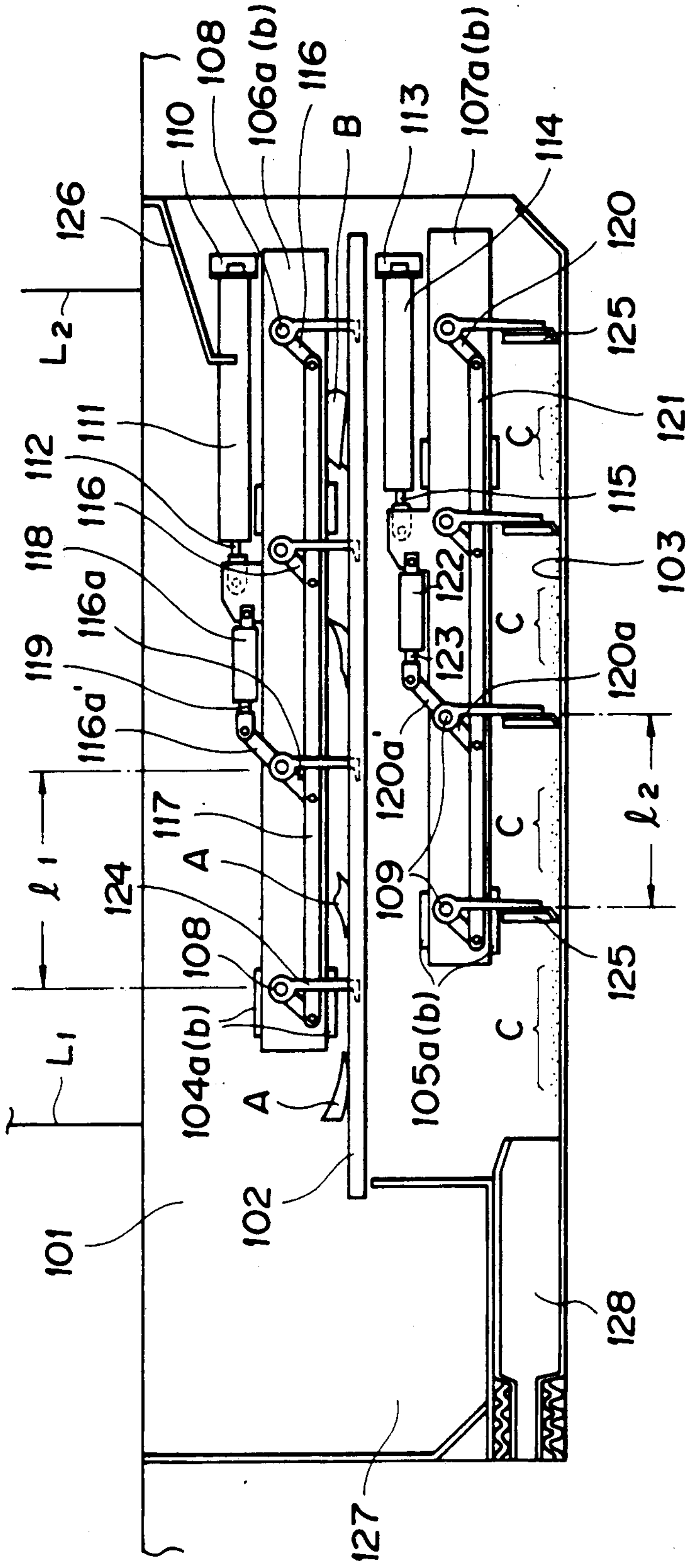
FIG. 1 is a front view of a removing apparatus for paper sheets, paper dust, etc., in an embodiment of the present invention.

The first embodiment of the present invention will be described with reference to FIGS. 1 to 7.

A removing apparatus for paper sheets, fold sections, paper dust, and the like, is disposed below a folding apparatus (not shown) of a rotary press situated between lines L1 and L2, for example.

In this removing apparatus, a hopper space 101 is divided into an upper space and a lower space by a multiple comb-like longitudinal grid 102 disposed in such a manner as to extend in a span direction of both side frames, and the bottom of the lower space is a dust collection groove surface 103 that extends in a longitudinal direction.

Upper guide/support portions **104*a*, 104*b* and lower guide/support members 105*a*, 105*b* are disposed on both sides of the upper and lower spaces in the span direction of both side frames, respectively, and upper frame plates 106*a*, 106*b* and lower frame plates 107*a*, 107*b* are supported and guided slidably in the longitudinal direction by the upper and lower guide/support portions 104*a*, 104*b* and 105*a*, 105*b*, respectively. A plurality (four, in the drawings) of upper rotary shafts 108, 108, . . . and a plurality of lower rotary shafts 109, 109, . . . are disposed equidistantly and in parallel with one another in the longitudinal direction between mutually opposed parallel upper frame plates 106*a* and 106*b* and between mutually opposed lower frame plates 107*a* and 107*b*, respectively. These upper and lower rotary shafts 108, 108, 109, 109 are supported rotatably at their both ends by the upper and lower frame plates 106***a*, 106*b*, 107*a*, 107*b*, respectively. The upper frame plates 106*a*, 106*b* and the upper rotary shafts 108, 108 together form a frame member and the lower frame plates 107*a*, 107*b* and the lower rotary shafts 109, 109 together form a frame member.

A first upper fluid pressure cylinder 111 is disposed in the longitudinal direction above one 106*a* of the upper frame plates through an upper bracket 110 and the tip of a piston rod 112 of this first upper fluid pressure cylinder 111 is connected to the upper frame plate 106*a*. Similarly, a first lower fluid pressure cylinder 114 is disposed in the longitudinal direction above the lower frame plate 107*a* through a lower bracket 113 and the tip of a piston rod 115 of the first lower fluid pressure cylinder 114 is connected to the lower frame plate 107*a*.

The operation stroke S1 of the first upper fluid pressure cylinder 111 is greater by a suitable length (e.g. 10–30 mm) than the axial distance l1 between the upper rotary shafts 108, 108 and the operation stroke S2 of the first lower fluid pressure cylinder 114 is greater by the suitable length described above than the axial distance l2 between the lower rotary shafts 109, 109.

Rotary arms 116, 116, . . . are fixed near the end of the upper rotary shafts 108, 108 . . . on the side of the upper frame plate 104*a*, and the rocking end of each rotary arm 116 is pivotally fitted to a link rod 117 which is in parallel with the upper frame plate 106*a*. One 116*a* of the rotary arms 116, 116, . . . extends to the opposite side beyond the pivotal point to form an extension arm portion 116*a*' and its tip is pivotally fitted to the tip of the piston rod 119 of the second upper fluid pressure cylinder 118 whose cylinder main body end is pivotally fitted to the upper frame plate 106*a*.

Similarly, rotary arms 120, 120, . . . are fixed near the end of the lower rotary shafts 109, 109 . . . on the side of the lower frame plate 107*a* and the rocking end of each rotary arm 120, 120 is pivotally fitted to a link rod 121 which is in parallel with the lower frame plate 107*a*. One 120*a* of the rotary arms 120, 120, . . . extends to the opposite side beyond the pivotal point and forms an extension arm portion 120*a*'. Its rocking end is pivotally fitted to the tip of the piston rod 123 of the second lower fluid pressure cylinder 122 whose cylinder main body end is pivotally fitted to the lower frame plate 107*a*.

Figure 2:
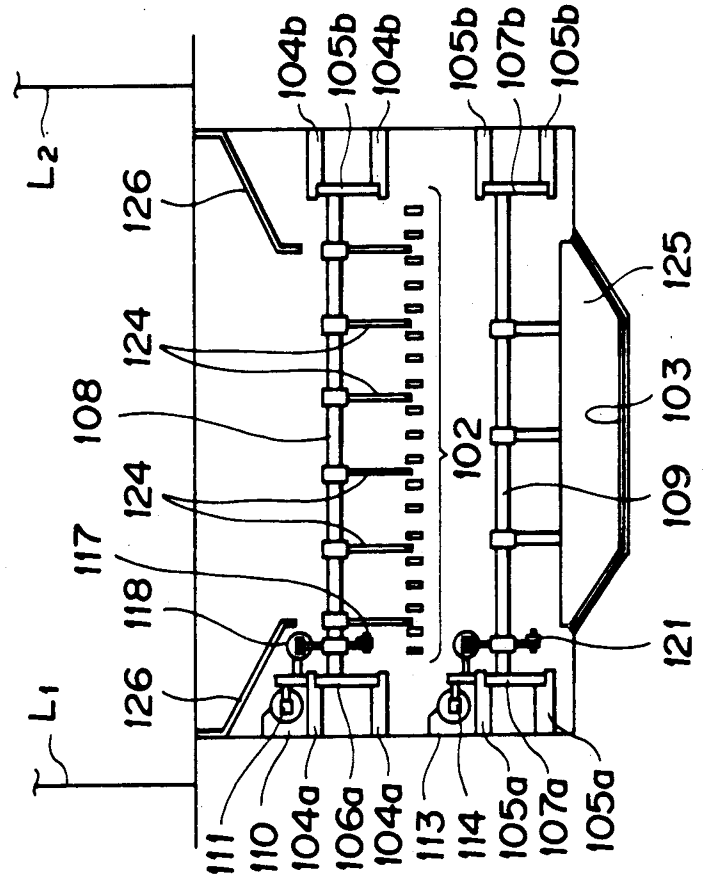

A plurality (six equidistant hooks in the drawing) of hooks 124, 124 whose tip is capable of coming close to the surface of a longitudinal grid 102, preferably capable of projecting into the gaps of the grid, are fixed in the form of rotary arms to each upper rotary shaft 108 as shown in FIG. 2. A scraping plate 125 which is in registration with the section of a dust collection groove surface 103 and whose tip is capable of coming close to, and facing, it is fixed in the form of a rotary arm to each lower rotary shaft 109 through a support arm.

It is possible to fit a brush or a flexible rubber plate or a synthetic resin plate to the tip of the scraping plate 125 so as to wipe the dust collection groove surface 103. It is also possible to fit a scraping plate 125' capable of coming close contact with, and facing, the upper surface of the longitudinal grid 102 to each hook 124, 124 of the upper rotary shaft 108 in the same way as the scraping plate 125 of the lower rotary shaft 108 (see FIG. 3).

Canopy-like guide slope plate 126, 126, 126 are disposed on the upstream side and both sides of the upper space above the first and second upper fluid pressure cylinders 111 and 118. A backet 127 continuing the longitudinal grid 102 and a paper dust reception port 128 below the former are disposed on the downstream side of the lower space.

The sequence control of the operations of the first upper fluid pressure cylinder 111, the first lower fluid pressure cylinder 114, the second upper fluid cylinder 118 and the second lower fluid presssure cylinder 122 is conducted by an ordinary controller, not shown, or by a manual operation of an operator.

The operation and function of the removing apparatus for paper sheets, fold sections, paper dust, etc., in this first embodiment will now be explained.

FIG. 1 shows the state of the removing apparatus before the start of its operation. The first upper fluid pressure cylinder 111, the first lower fluid pressure cylinder 114, the second upper fluid pressure cylinder 118 and the second lower fluid pressure cylinder 122 are not activated and all the piston rods 112, 115, 119, 123 are under the retracted state. Therefore, the hooks 124, 124, . . . and the scraping plates 125, 125, . . . are under the upright state.

Figure 4:
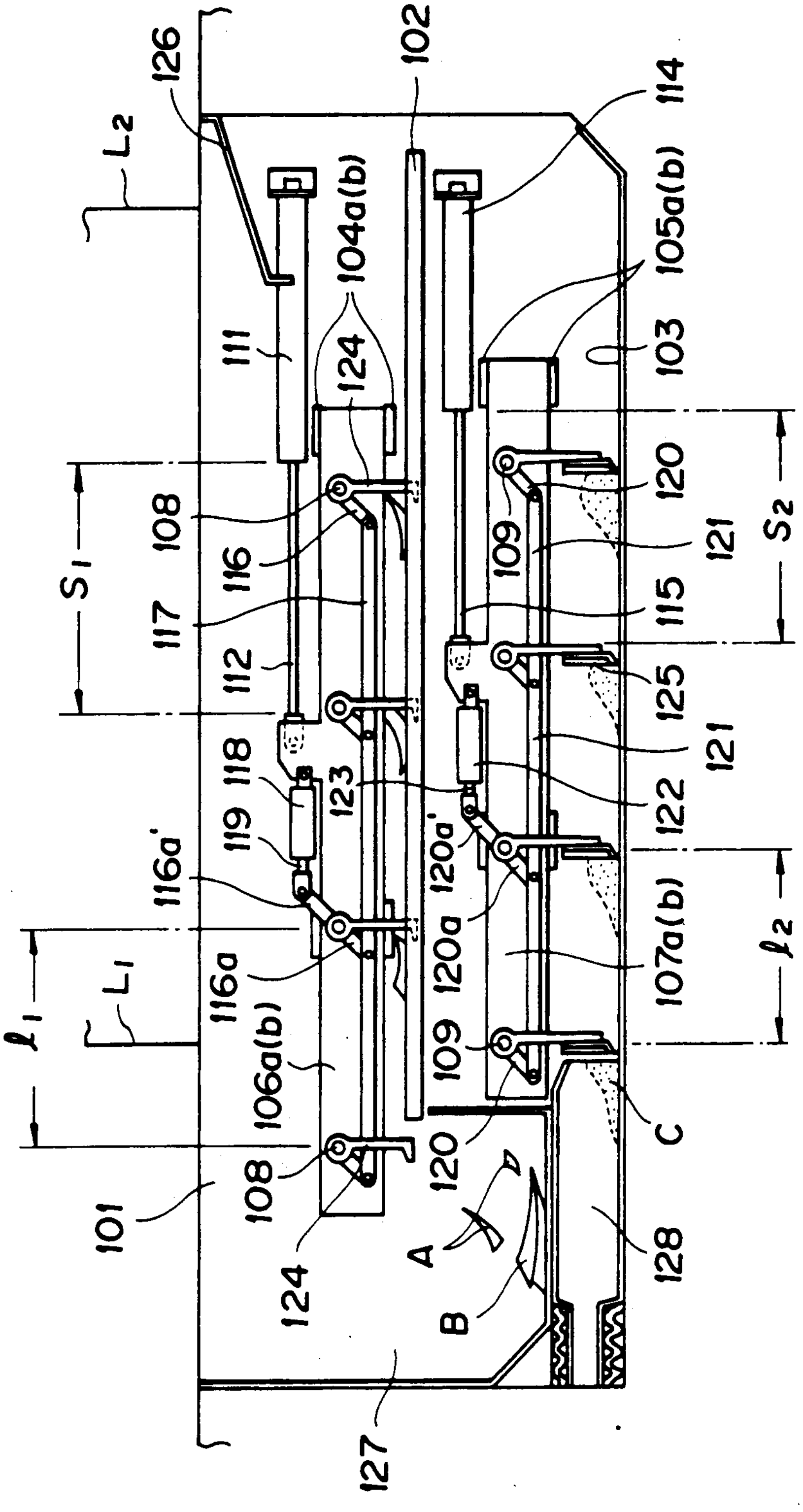
FIGS. 4 to 7 are front views of the removing apparatus for paper sheets, paper dust, etc., in the embodiment of the present invention and show the operation of the removing apparatus.

Large paper sheets A falling from the folding apparatus of the rotary press or fold sections B that are not delivered normally from the delivery section of the folding apparatus are received by the longitudinal grid 102 and stay there. Smaller paper dust C likewise falling down passes through the grid gaps of the longitudinal grid 102 and accumulate and stay on the dust collecting groove surface 103. The paper sheets A, the fold sections B and the paper dust C falling nearby are caused to drop at least onto the longitudinal grid 102 by the guide slope plates 126 without staying. When the removing apparatus is operated, the first upper fluid pressure cylinder 111 and the first lower fluid pressure cylinder 114 are first activated as shown in FIG. 4, so that their respective piston rods 112, 115 project and the upper frame plates 106*a*, 106*b* and the lower frame plates 107*a*, 107*b* are slid while being guided by the guide support portions 104*a*, 104*b*, 105*a*, 105*b*, thereby moving forth the upper rotary shafts 108, 108, . . . and the lower rotary shafts 109, 109, . . . to their advance positions.

Accordingly, the paper sheets A and the fold sections B (hereinafter referred to as the "paper sheets A and the like") staying on the longitudinal grid 102 in the upper space are pushed forth by the operation stroke S1 of the first upper fluid pressure cylinder 111 by the hooks 124, 124, . . . . In other words, the paper sheets A and the like that exist in front of one hook 124 is pushed ahead of the original position of the hook 124 immediately ahead of this one hook and the paper sheets A and the like that exist in front of the foremost hook 124 are caused to drop into the bucket 127 from the tip of the longitudinal grid 102.

Simultaneously, the paper dust C staying on the dust collection groove surface 103 in the lower space is pushed forth by the operation stroke S2 of the first lower fluid pressure cylinder by the scraping plates 125, 125. In other words, the paper dust C that exists in front of one scraping plate 125 is pushed ahead of the original position of the scraping plate 125 immediately ahead of this one scraping plate, and the paper dust C that exists in front of the foremost scraping plate 125 is discharged into the paper dust reception port 128 from the tip of the dust collection groove surface 103.

Figure 5:
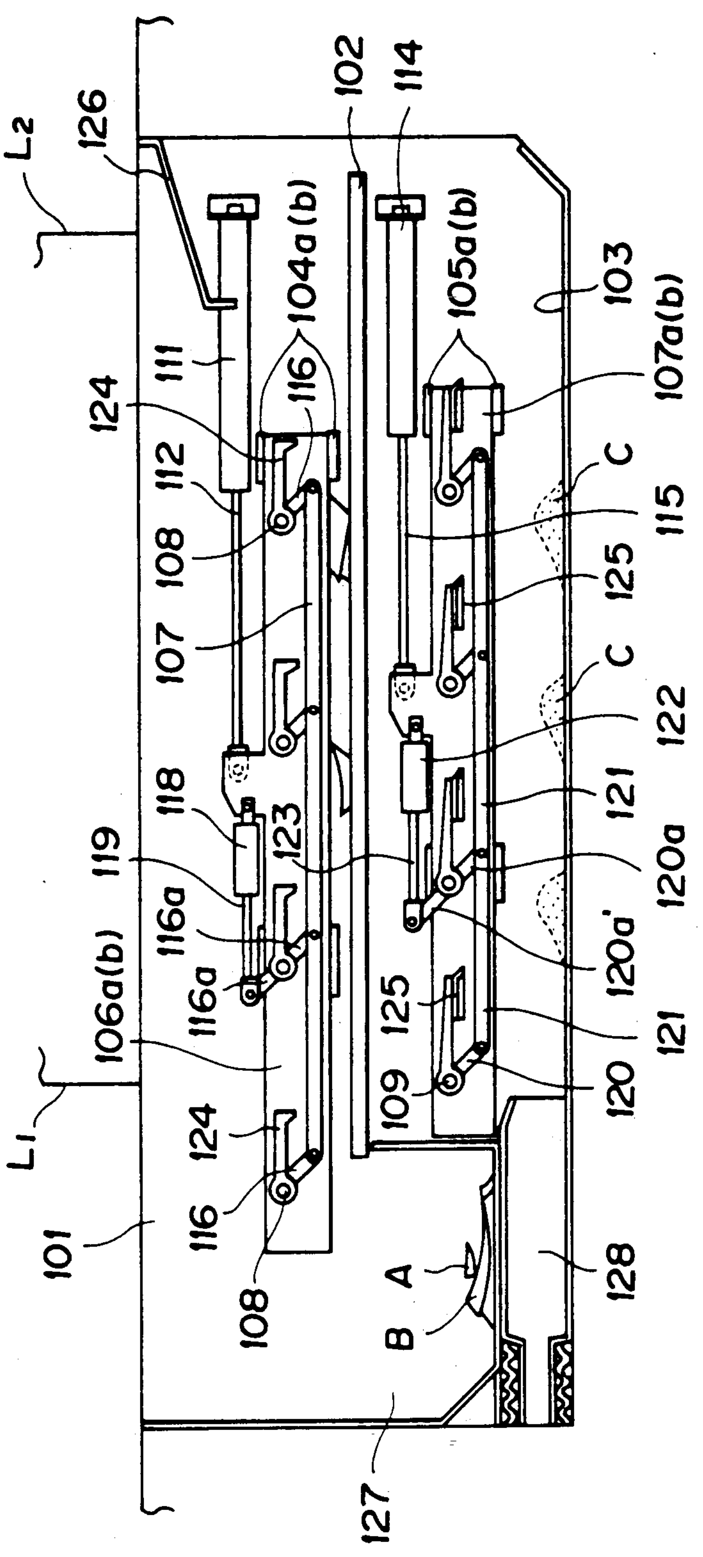

Thereafter, the second upper fluid pressure cylinder 118 and the second lower fluid pressure cylinder 122 are activated as shown in FIG. 5 and their piston rods 119 and 123 project to that when the extension arm portion 116', 120' of one rotary arm 116, 120 is pushed, the rotary arm 116, 120 rotates counter-clockwise and the like rod 117, 121 moves back. Then, all the rotary arms 116, 116, . . . , 120, 120, . . . are altogether rotated counter-clockwise and eventually, all the upper rotary shafts 108, 108, . . . and all the lower rotary shafts 109, 109 are altogether rotated counter-clockwise. As a result, all the hooks 124, 124, . . . rotate counter-clockwise in the upper space and their tips move away upward past through the grid gaps of the longitudinal grid 102. In the lower space, too, all the scraping plates 125, 125 rotate counterclockwise and moves away upward.

Figure 6:
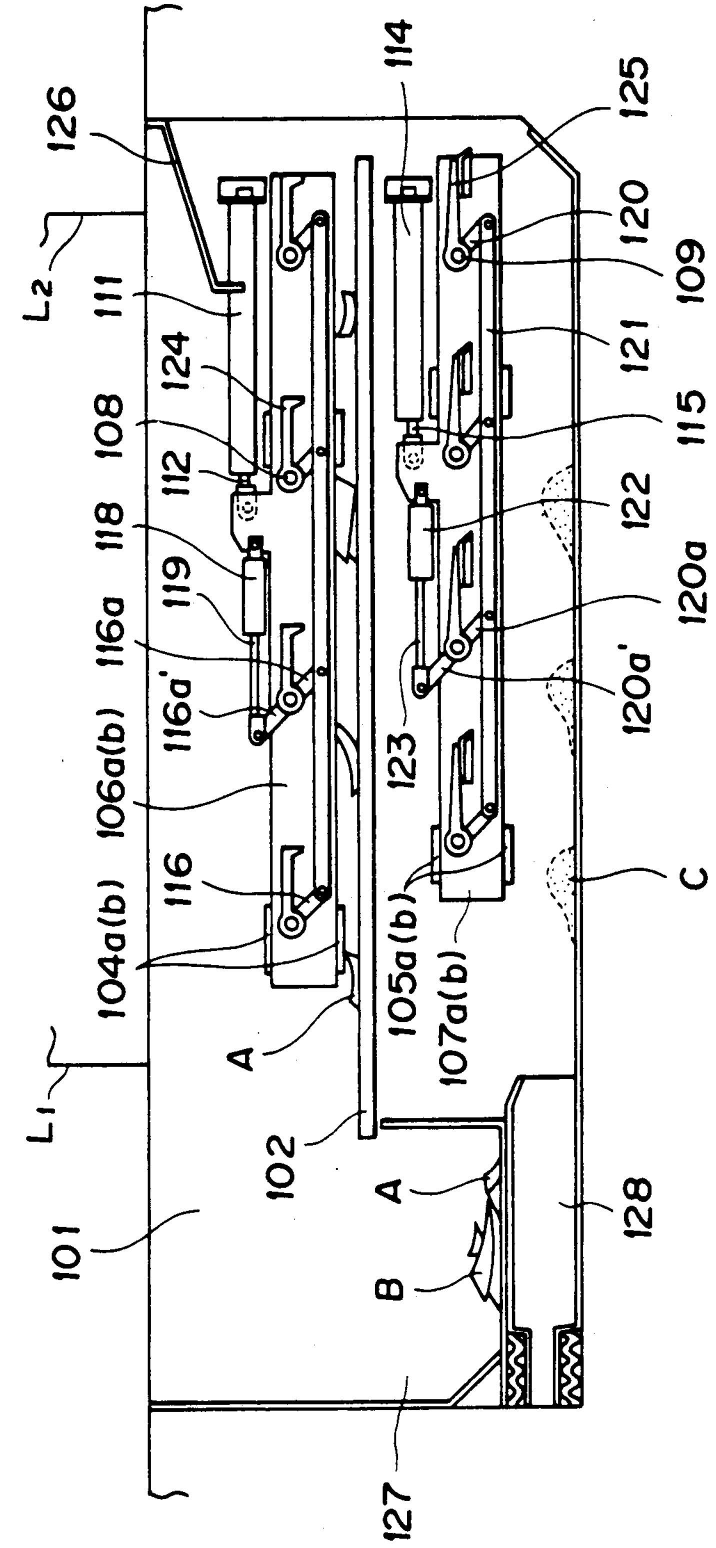

Next, the first upper fluid pressure cylinder 111 and the first lower fluid pressure cylinder 114 are activated as shown in FIG. 6, their piston rods 112, 115 contract and the upper frame plates 106*a*, 106*b* and the lower frame plates 107*a*, 107*b* slide while being guided by the guide support portions 104*a*, 104*b*, 105*a*, 105*b* and are pulled back to the standby positions with the upper rotary shafts 108, 108, . . . and the lower rotary shafts 109, 109. In this instance, since the tips of all the hooks 124, 124 and all the scraping plates 125, 125, . . . are at the upper standby positions, they do not affect the paper sheets A and the like that have been pushed ahead stroke S1 by stroke and the paper dust C that has been pushed stroke S2 by stroke.

Figure 7:
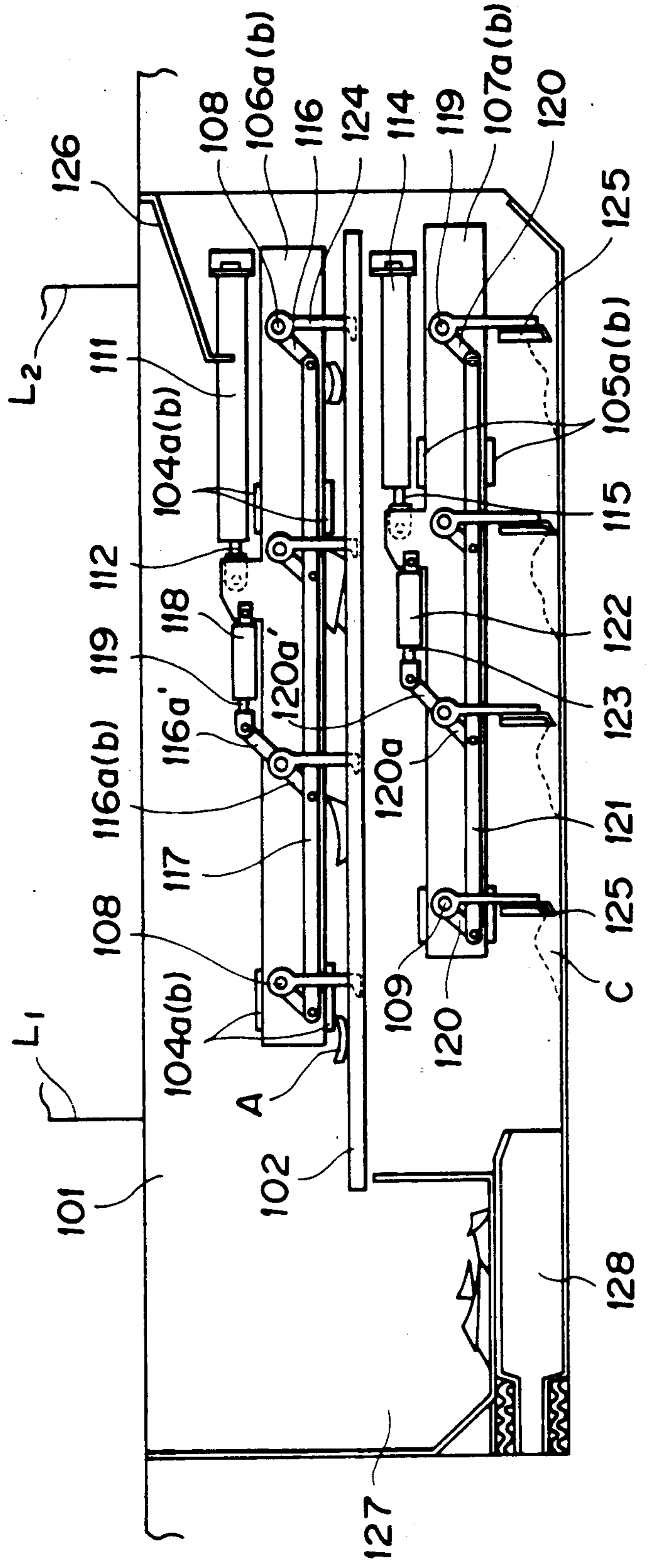

As shown in FIG. 7, the second upper fluid pressure cylinder 118 and the second lower fluid pressure cylinder 122 are then operated, their piston rods 119, 123 contact and pull back the extension arm portions 116', 120' of one each rotary arm 116, 120 and the rotary arm 116, 120 rotates clockwise to move forth the link rod 117, 121. Then, all the rotary arms 116, 116, . . . 120, 120 are altogether rotated clockwise and subsequently, all the upper rotary shafts 108, 108, . . . and all the lower rotary shafts 109, 109, . . . are rotated clockwise. Accordingly, all the hooks 124, 124, . . . rotate clockwise in the upper space and their tips return to their original positions where they project into the grid gaps of the longitudinal grid 102. Similarly, in the lower space, too, all the scraping plates 125, 125, . . . rotate clockwise and their tips return to their original positions where they are close to, and face, the dust collection groove surface 103.

Thereafter, the operations described above shown in FIGS. 4 to 7 are repeated so that the paper sheets A, the fold sections B and the paper dust C staying on the longitudinal grid 102 and the dust collection groove surface 103 are sequentially pushed forth and are discharged into the bucket 127 and the paper dust reception port 128.

Figure 3:
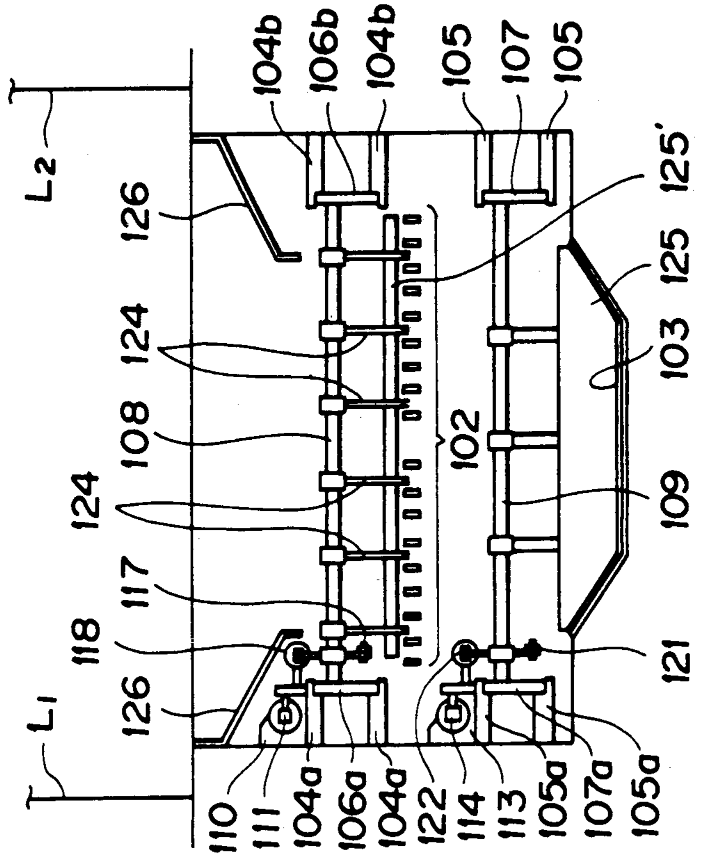
FIGS. 2 and 3 are side views of the removing apparatus for paper sheets, paper dust, etc., in the embodiment of the present invention.

The operation described above holds true also of the hook 124 to which the scraping plate 125' such as shown in FIG. 3 is fitted, and the movement of the paper sheets A and the like on the upper surface of the longitudinal grid 102 becomes more reliable.

Though the first embodiment described above uses the fluid pressure cylinder as the driving device for the upper and lower frame plates and for the rotary arms, a mechanism using a motor, for example, can also be used so long as it operates synchronously.

The second embodiment of the present invention will be described with reference to FIGS. 8 to 13.

The removing apparatus for paper sheets, fold sections, paper dust, etc., is disposed below the folding apparatus, not shown, of the rotary press, for example.

Figure 8:
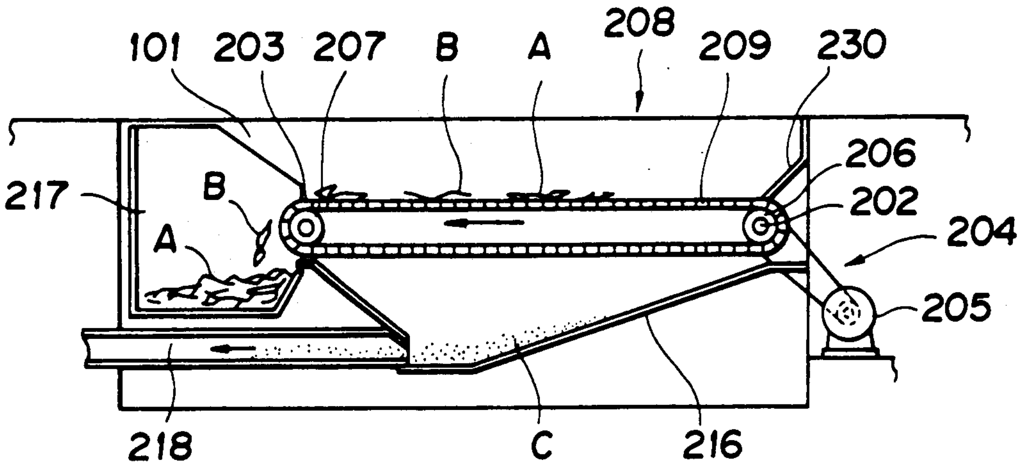
FIG. 8 is a front view of a removing apparatus for paper sheets, paper dust, etc., in the second embodiment of the present invention.

In this embodiment, rotary shafts 202, 203 on the upstream and downstream sides have their both ends supported rotatably at middle stage positions in the hopper space 101 of the removing apparatus, as shown in FIG. 8. One of them or the rotary shaft 202 on the upstream side in the embodiment shown in the drawing, is driven for rotation by a motor 205 through a belt transmission mechanism 204. An endless belt is wound on rollers 206, 207 fitted to these rotary shafts 202, 203, thereby consistuting a conveyor 208.

An example of the endless belt is a gapped endless belt shown in FIGS. 8 to 12.

Figure 9:
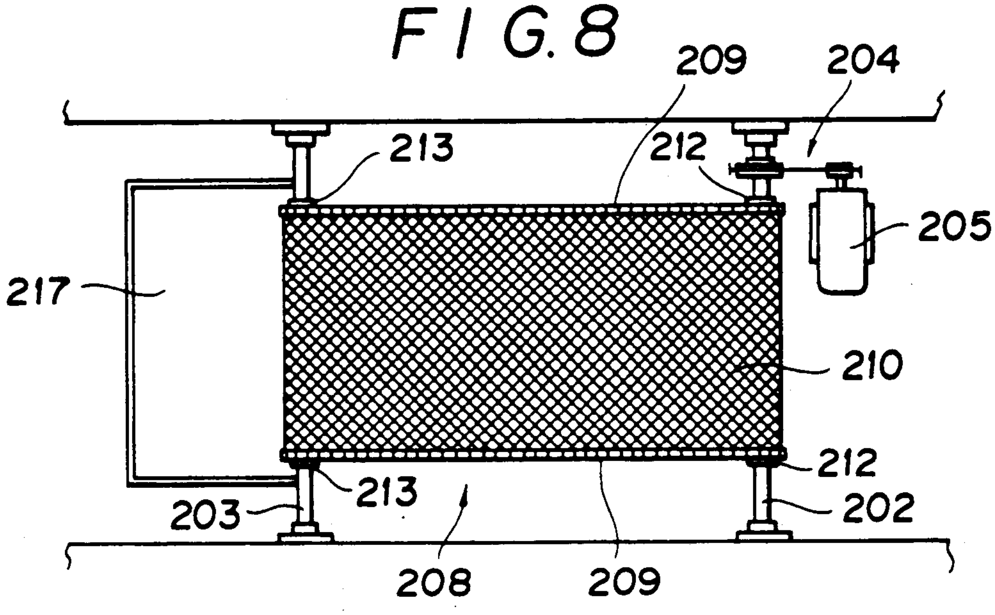
FIGS. 9 and 10 are plan views of the removing apparatus for paper sheets, paper dust, etc., shown in FIG. 8.
Figure 10:
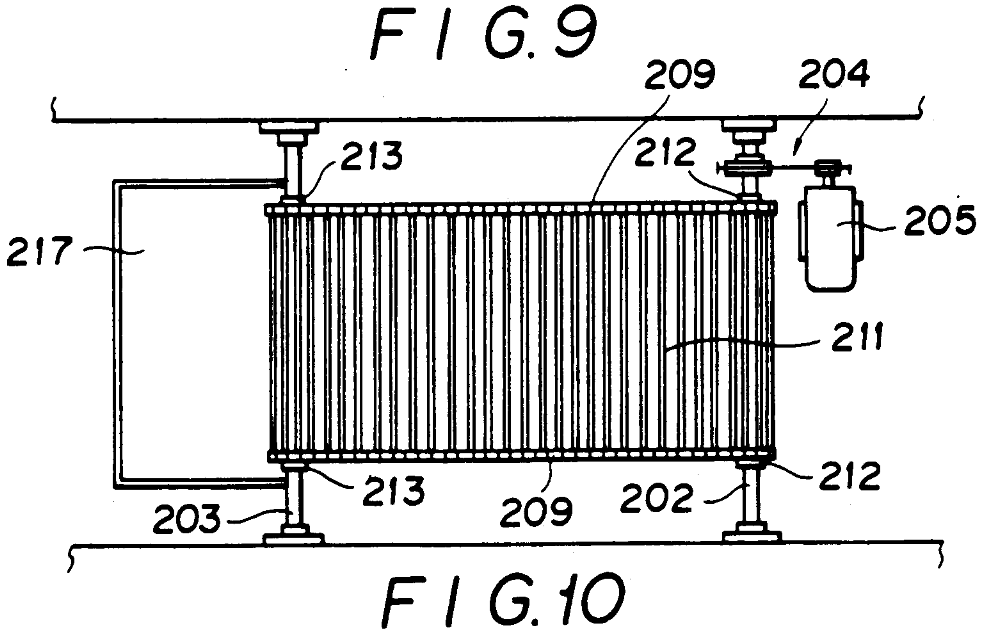

In the gapped endless belt shown in FIG. 9, both of its side edges consist of a mesh member 210 fitted to endless chains 209, 209 (hollow pinch chains, for example) and the gapped endless chain shown in FIG. 10 is a curtain-like member 211 consisting of a plurality of wire members whose both ends are fitted to the endless chains 209, 209 on both of its sides.

In the case of the gapped endless belts shown in FIGS. 9 and 10, sprockets 212, 212; 213, 213 engaging with the endless chains 209, 209 are fitted to both ends of the rollers 206, 207 (see FIG. 9).

Figure 11:
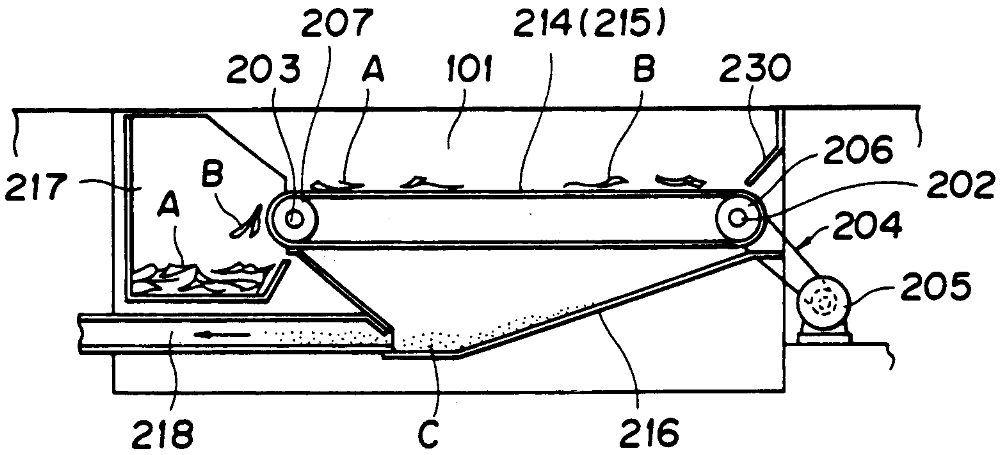
FIG. 11 is a front view of a removing apparatus for paper sheets, paper dust, etc., in the second embodiment of the present invention.
Figure 12:
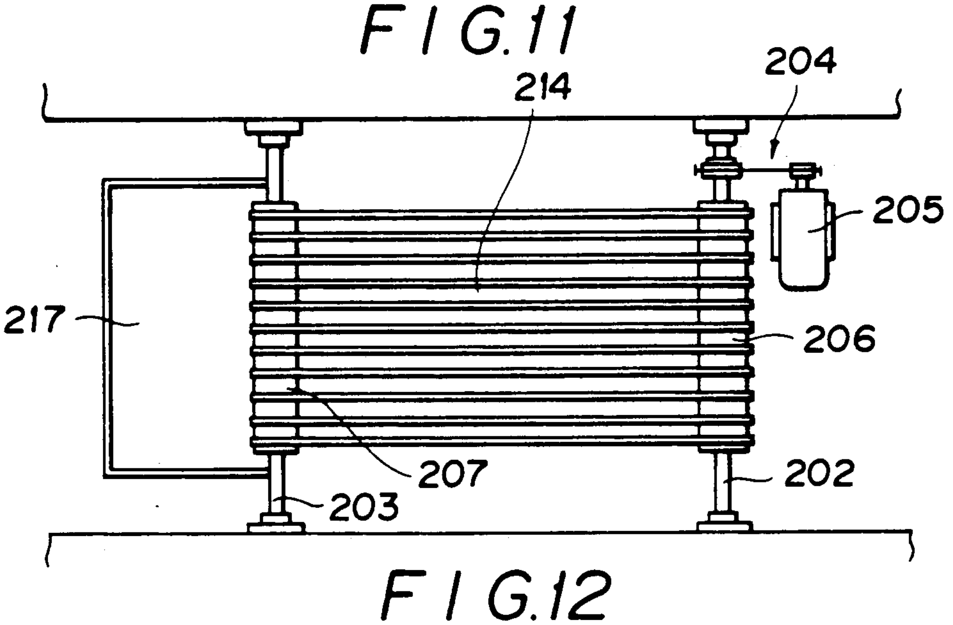
FIGS. 12 and 13 are plan views of the removing apparatus for paper sheets, paper dust, etc., shown in FIG. 11.

The gapped endless belts shown in FIGS. 11 and 12 are multiple wire-like belts 214 consisting of multiple synthetic resin strings [e.g. "Polycords" (trade name) or "Bancord cords" (trade name)] or spring wires wound on the rollers 206, 207 with parallel gaps between them. In this case, the endless chains 209, 209 and the sprockets 212, 212; 213, 213 are not necessary.

Figure 13:
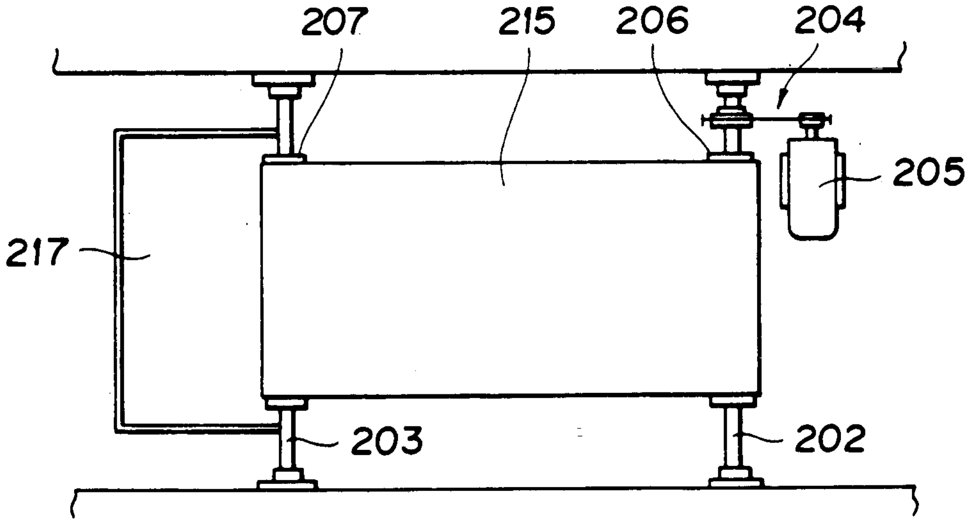

Though the endless belt is preferably the gapped endless belt as described above, it may be an ordinary conveyor belt 215 as a non-gapped endless belt in place of the multiple wire belt 214 (see FIG. 13).

In the hopper space 101 of the removing apparatus, a dust collection slope portion 216 descending from the upstream side to the downstream side is formed below the conveyor 208, and the bucket 217 continuing the conveyor 208 and the paper dust reception port 218 are disposed one upon another on the downstream side of the hopper space 101.

Figure 14:
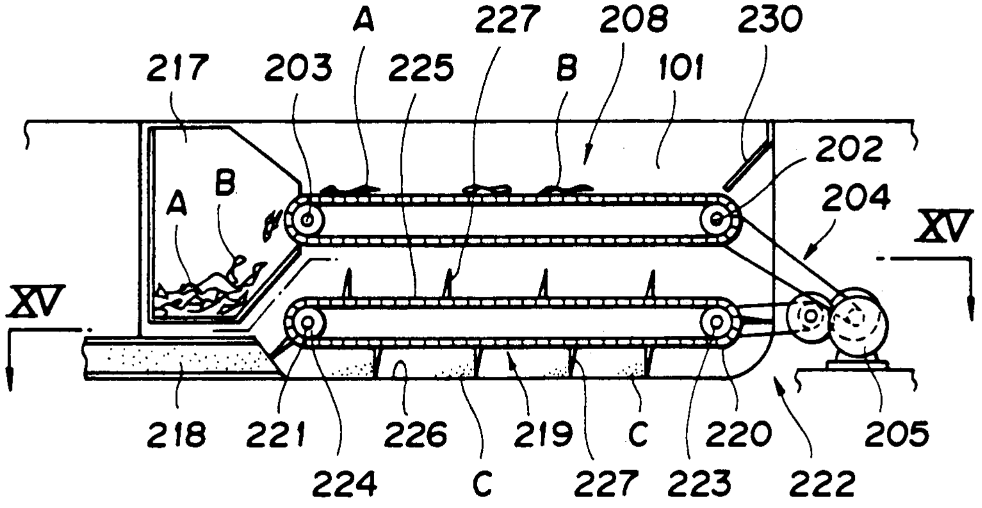
FIG. 14 is a front view of the removing apparatus for paper sheet, paper dust, etc., in the third embodiment of the present invention.
Figure 15:
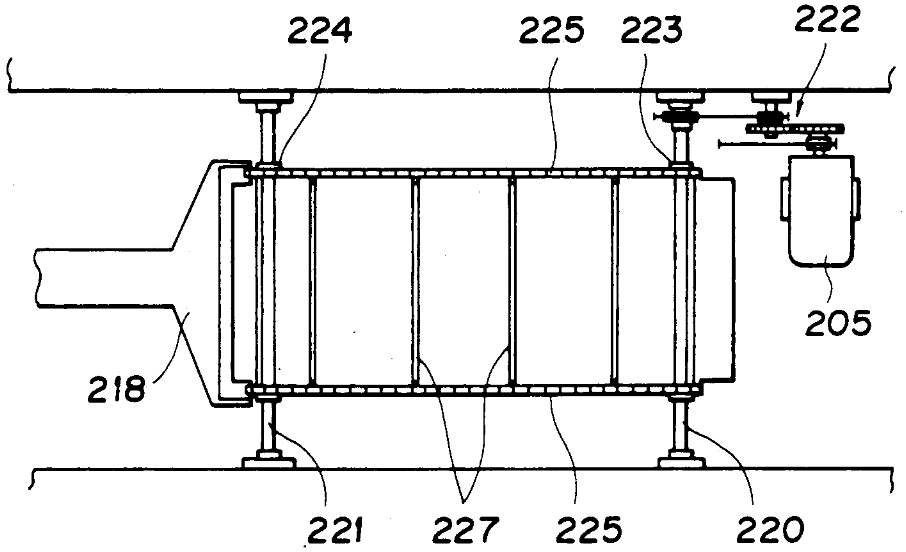
FIG. 15 is a sectional view taken along line of FIG. 14.

In the third embodiment of the present invention, a paper dust scraping apparatus 219 is disposed in place of the dust collection slope portion 216 in the second embodiment as shown in FIGS. 14 and 15. In other words, the conveyor 208 and the paper dust scraping apparatus 219 are disposed in parallel with each other in the horizontal direction.

In the paper dust scraping apparatus 219, both ends of the upper and lower rotary shafts 220, 221 on the upstream and downstream sides are supported rotatably by the machine frame, and one of them or the rotary shaft 220 on the upstream side in the embodiment shown in the drawing is driven for rotation by a motor 205 in a direction opposite to the rotary shaft 202 of the conveyor 208 through a gear/belt transmission mechanism 222. Sprockets 223, 223; 224, 224 are fitted near both ends of the rotary shafts 220, 221, respectively, and the endless chain 225 is wound on each pair of the sprockets 223 and 224. The scraping plates 227 which extend in the axial direction of the rotary shaft 220 and whose tip can come close to, and face, the bottom surface 226 of the hopper space 101 as the dust collection surface are disposed between the endless chains 225, 225 on both sides in parallel with one another with gaps between them in the travelling direction of the endless chains 225, 225, forming thereby a socalled "scraper conveyor". It is possible to fit a brush or flexible rubber plate or a synthetic resin plate to the tip of each scraping plate 227 so as to wipe off the bottom surface 226. The rest of the constructions are the same as those of the second embodiment shown in FIGS. 8 to 12.

Figure 16:
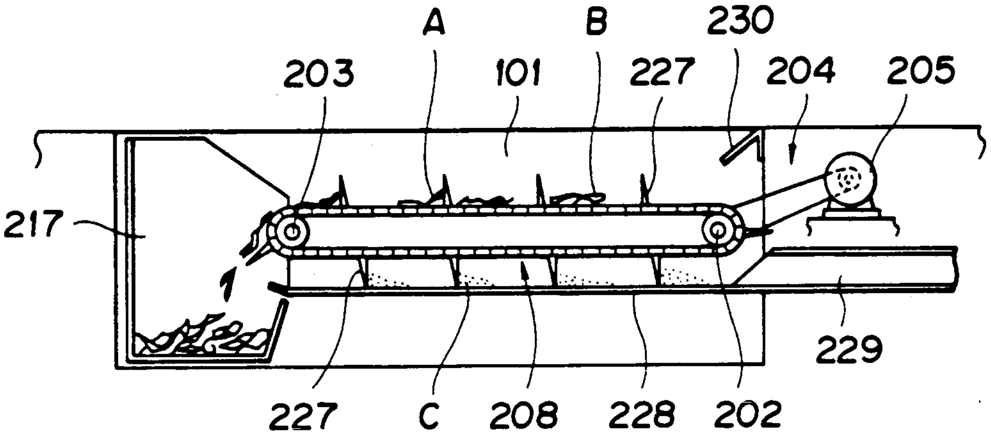
FIG. 16 is a front view of the removing apparatus for paper sheets, paper dust, etc., in the fourth embodiment of the present invention.
Figure 17:
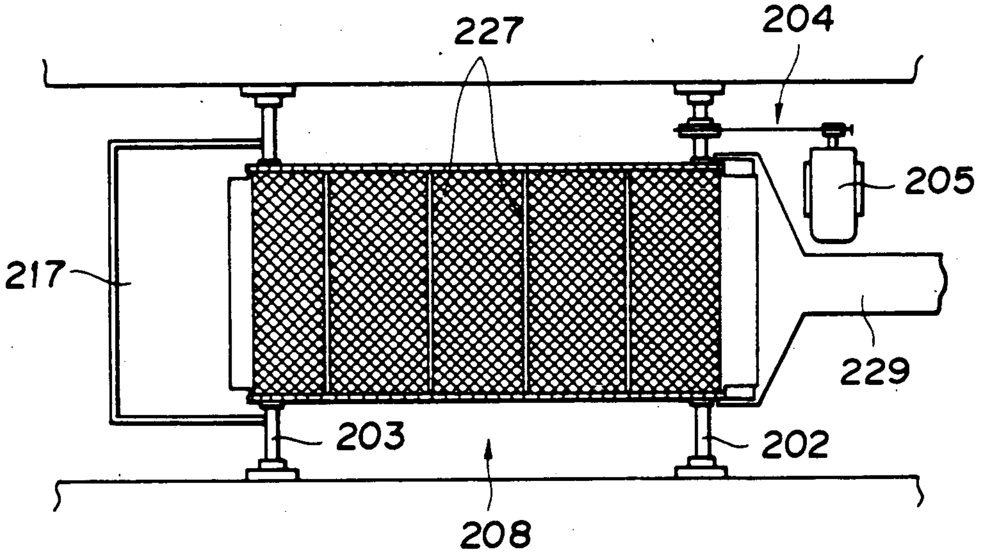
FIG. 17 is a plan view of the removing apparatus for paper sheets, paper dust, etc., in the fourth embodiment of the present invention.

In the fourth embodiment of the present invention shown in FIGS. 16 and 17, the gapped endless belt (the mesh member 210 being shown as an example) of the conveyor 208 in the second embodiment is provided with the scraping plates 227 such as those of the paper dust scraping apparatus 219 of the third embodiment with the gaps between them in the travelling direction of the gapped endless belt, and the dust collection surface portion 228 whose tip can come close to, and face, the tip of the scraping plates 227 is disposed below the conveyor 208 in place of the dust collection slope portion 216 in the second embodiment. Further, the paper dust reception port 229 continuing the dust collection surface portion 228 is disposed on the opposite side to the paper dust reception port 218 in the first embodiment. The rest of the constructions are the same as those of the second embodiment shown in FIGS. 8 to 12.

Canopy-like slope plates 230 are disposed on both upstream sides at the upper part of the hopper space 101.

The operation and function of the removing apparatus for paper plates, fold sections, paper dust, etc., in the second to fourth embodiments described above will now be explained.

In the second embodiment, large paper plates A falling from the folding apparatus of the rotary press and the fold sections B that are not delivered normally from the delivery portion of the folding apparatus but fall down are received by, and stay at, the endless belt of the conveyor 208, that is, the mesh member 210, the curtain-like member 211, the multiple wire belt 214 or the belt conveyor 215. The small paper dust C that falls from the folding apparatus of the rotary press passes through the gaps of the gapped endless belt and through the peripheral gaps, and is received by, and stays at, the dust collection slope portion 216 if the endless belt is the mesh member 210, the curtainlike member 211 or the multiple wire belt 214.

If the endless belt is the conveyor belt 215, the paper dust C is received by the conveyor belt 215 together with the paper plates A and the fold sections B and stays there, while the paper dust C falling into the peripheral gaps is received by the dust collection slope portion 216 and stays there.

The paper plates A, the fold sections B and the paper dust C that fall around the hopper space 101 fall at least onto the endless belt without staying by the function of the canopy-like slope plates 230, but the paper dust C having a particularly small size falls further therearound from the gaps.

When the motor 205 is activated in the conveyor 208, the rotary shafts 202, 203 and the rollers 206, 207 are rotated counter-clockwise through the belt transmission mechanism 204 in FIG. 8. Therefore, the mesh member 210 and the curtain-like member 211 rotate counter-clockwise through the sprockets 212, 212; 213, 213 and the endless chains 209, 209, while the multiple wire belt 214 rotates directly counter-clockwise in FIG. 8 by the rollers 206, 207. Accordingly, the paper plates A and the fold sections B (including the paper dust C, at times) staying on the mesh member 210, the curtain-like member 211, the multiple wire belt 214 or the conveyor belt 215 are conveyed to the downstream side (to the left in FIG. 8) and are caused to fall into the bucket 217.

The paper dust C staying on the dust collection slope portion 216 slides down gradually into the paper dust reception port 218 due to the inclination and is discharged from it.

In the third embodiment, the paper plates A and the fold sections B are received by, and stay on, the gapped endless belt of the conveyor 208, that is, the mesh member 210, the curtainlike member 211 or the multiple wire belt 214 in the same way as in the second embodiment, while the paper dust C passes through the gaps of the mesh member 210, the curtain-like member 211 or the multiple wire belt 214 and through the peripheral gaps, further drops, then falls past through the paper dust scraping apparatus (scraper conveyor) 19 and accumulates and stays on the bottom surface 226.

In the conveyor 208, the paper plates A and the fold sections B are conveyed to the downstream side (to the left in FIG. 14) in the same way as in the second embodiment and are caused to fall into the bucket 217.

The motor 205 is then driven in the paper dust scraping apparatus 219 and the rotary shafts 220, 221 and the rollers 223, 224 rotate clockwise in FIG. 14 through the gear/belt transmission mechanism 222. Accordingly, the scraping plates 227, 227, . . . , too, rotate clockwise in FIG. 14. Therefore, the paper dust C staying and deposited on the bottom surface 226 is gradually scraped off by the scraping plates 227, 227, . . . towards the paper dust reception port 218 and is then discharged.

In the fourth embodiment, the paper plates A and the fold sections B are received by, and stay on, the gapped endless belt of the conveyor 208, that is, the mesh member 210, the curtain-like member 211 or the multiple wire belt 214 in the same way as in the second embodiment, while the paper dust C passes through the gaps of the mesh member 210, the curtain-like member 211 or the multiple wire belt 214 and through the peripheral gaps, is received by the dust collection surface 228 and accumulates and stays there.

In the belt conveyor 208, the scraping plates 227, 227, . . . , too, rotate counterclockwise in FIG. 16 together with the mesh member 210, the curtain-like member 211 or the multiple wire belt 214. Accordingly, the paper plates A and the fold section C are conveyed towards the downstream side (to the left in FIG. 16) and are caused to fall into the bucket 217. The paper dust C deposited and staying on the dust collection surface 228 is gradually scraped off by the scraping plates 227, 227, . . . to the paper dust reception port 229 (on the right side in FIG. 16) and is then discharged.

The fifth to seventh embodiments of the present invention will be explained with reference to FIGS. 18 to 28.

The removing apparatus for paper sheets, fold sections, paper dust, etc., is disposed at a portion where the paper sheets, the fold sections, paper dust, etc., are deposited such as at a portion below a folding apparatus (not shown) of the rotary press, for example.

Figure 18:
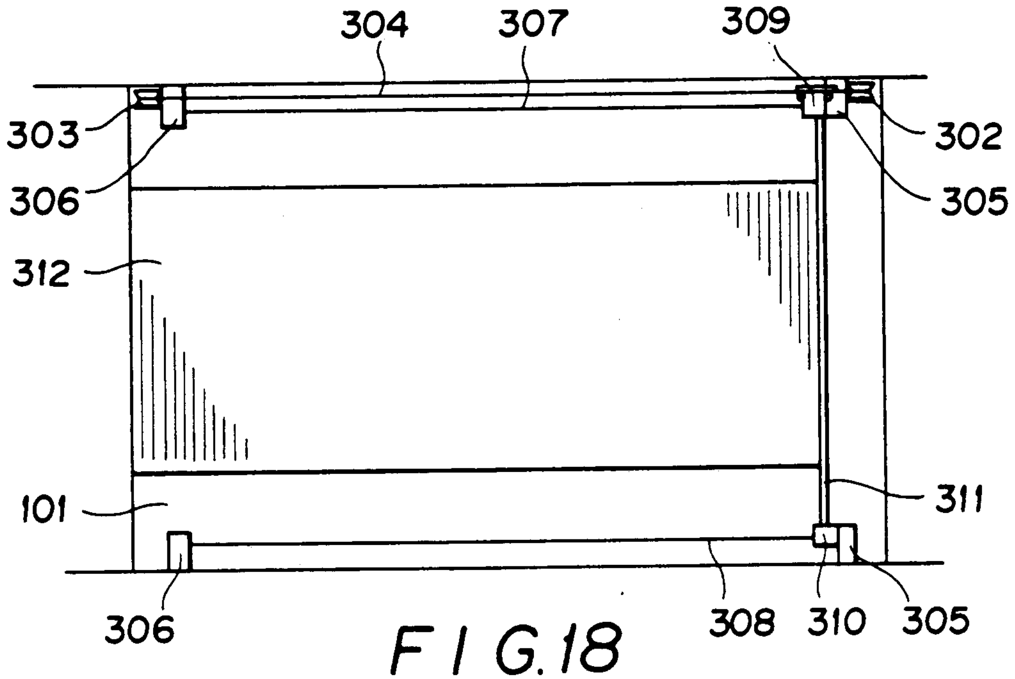
FIG. 18 is a plan view of the removing apparatus for paper sheets, fold sections, paper dusts, etc., in a rotary press in accordance with the fifth embodiment of the present invention.
Figure 19:
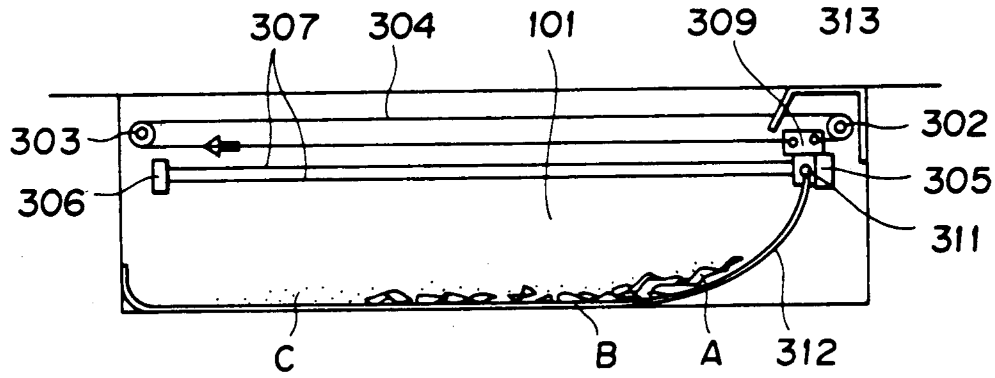
FIGS. 19 to 21 are sectional front views of the removing apparatus for paper sheets, fold sections, paper dust, etc., in the fifth embodiment of the present invention.
Figure 20:
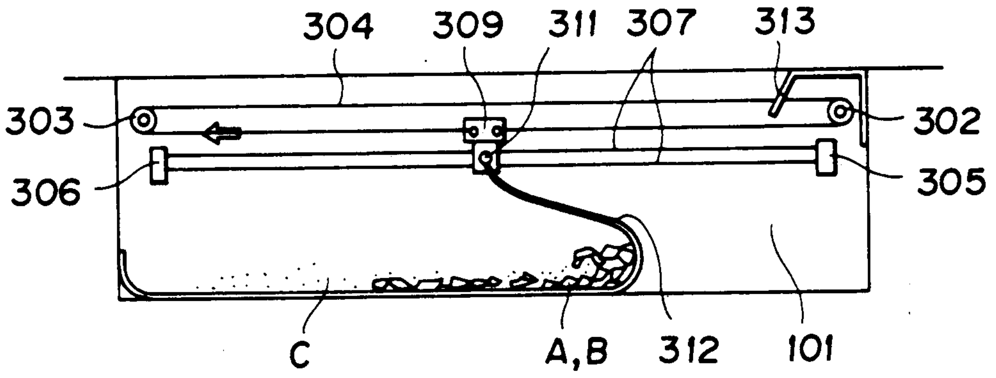

In the fifth embodiment, an endless rope 304 is wound on pullies 302, 303 on the upstream and downstream sides that are rotatably supported by the side surfaces at the upper part of the hopper space 101 of the removing apparatus as shown in FIGS. 18 and 19.

Brackets 305, 305; 306, 306 project from both side surfaces of the hopper space 101 considerably below the pullies 302, 303 on the upstream and downstream sides, respectively, and a guide wire 307, 308 is spread between each pair of brackets 305, 306 on the upstream and downstream sides. Each guide wire 307, 308 consists of a pair of upper and lower wires that are in parallel with each other, and is inserted through each sliding block 309, 310. The sliding block 309, 310 is slidable while being guided by the guide wire 307, 308. The sliding block 309 on the endless rope side is fixed to the lower travelling side of the endless rope 304. (The endless rope 304 may be formed by coupling both ends of a rope to the sliding block 309.)

Each end of a frame rod 311 which is vertical relative to the guide wire 307, 308 is fitted to each sliding block 309, 310.

The edge of a wide flexible sheet 312 (a little bit narrower than the width of the bottom surface of the hopper space 101) on the upstream side which is disposed substantially throughout the bottom surface of the hopper space 101 is fitted on the upstream side to the frame rod 311 in such a manner as to somewhat slacken the flexible sheet 312, and its edge on the downstream side is fitted to the wall surface on the downstream side near the bottom surface of the hopper space 101 or to the bottom surface near the downstream end.

Incidentally, the canopy-like slope plates 313 are fitted to the upper peripheral edge on the upstream and both sides of the hopper space 101 (only the upstream side being shown in the drawing).

In the sixth embodiment, the pullies 302, 303, the endless rope 304, the brackets 305, 306, the guide wires 307, 308, the sliding blocks 309, 310 and the canopy-like slope plate 313 are substantially the same as those of the fifth embodiment.

Figure 22:
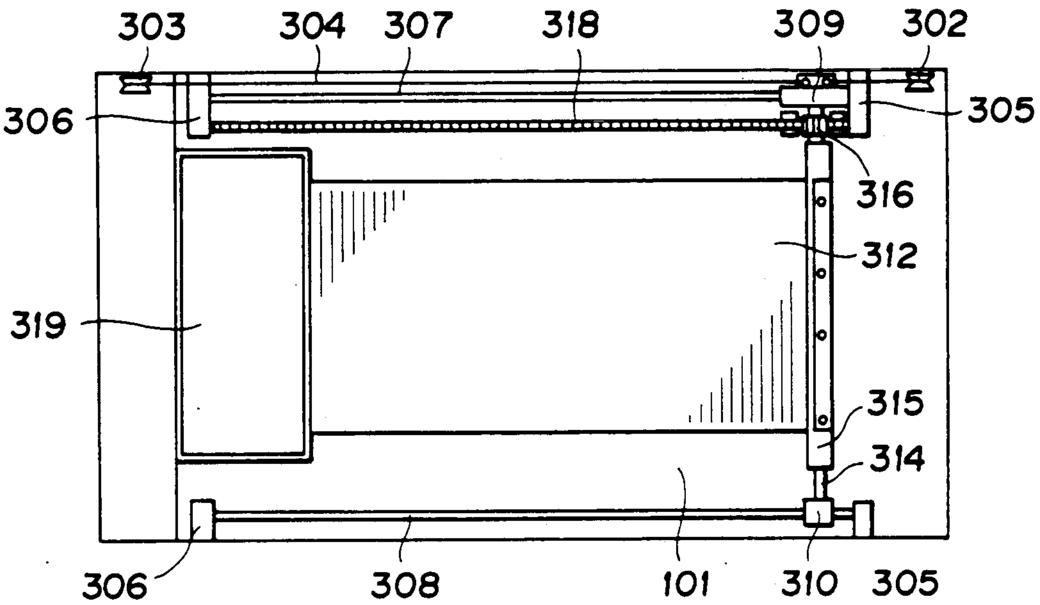
FIG. 22 is a plan view of the removing apparatus for paper sheets, fold sections, paper dust, etc., in a rotary press in accordance with the sixth embodiment of the present invention.
Figure 23:
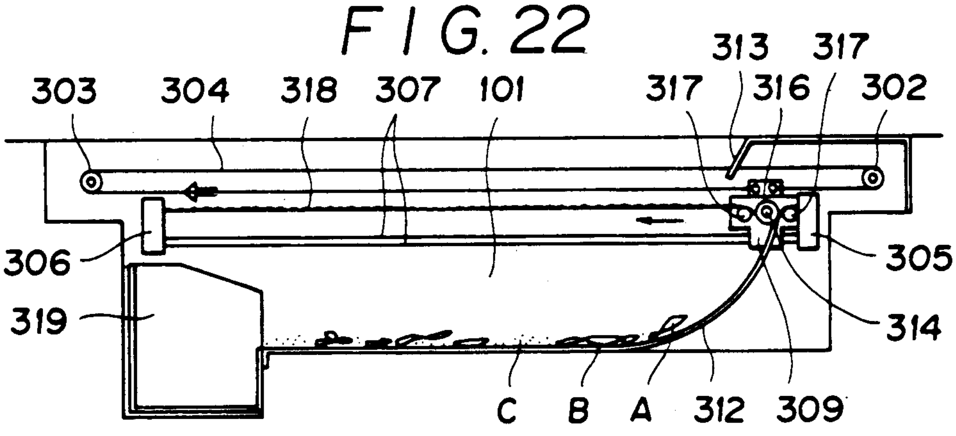
FIGS. 23 to 25 are sectional front views showing the operation of the removing apparatus for paper sheets, fold sections, paper dust, etc., in accordance with the sixth embodiment of the present invention.

In the sixth embodiment, further, fitting to each sliding block 309, 310 on both sides of the frame rod 311 is particularly rotatable as shown in FIGS. 22 and 23 and the frame rod 311 becomes the rotary shaft 314. A timing pulley 316 adjacent to a take-up roller 315 and the sliding block 7 on the rope side is fixed to the rotary shaft 314 and a pair of idle pullies 317, 317 are rotatably supported by the sliding block 309 with the timing pulley 316 being the center. A timing belt 318 having upwardly facing teeth is extended between the brackets 305 and 306 in parallel with the upper side of the guide wire 307 on the endless rope side and is wound on the lower peripheral surface of the timing pulley 316 and on the upper peripheral surface of the pair of idle pullies 317, 317. A rack-pinion mechanism may be employed in place of the timing belt-timing pulley mechanism described above.

The bottom surface of the hopper space 101 on the downstream side is a cavity, where the bucket 319 is disposed. Casters may be fitted to the bucket 319 in order to make the push-pull operation of the bucket 319 into and from the cavity.

The edge of the wide flexible sheet 312 (a little bit narrower than the width of the bottom surface of the hopper space 101) on the upstream side which is disposed on the bottom surface of the hopper space 101 is fitted to the take-up roller 315 positioned on the upstream end in such a manner as to somewhat slacken the flexible sheet 312 as shown in FIG. 23, and its edge on the downstream side is fitted to the bucket port edge position of the bottom surface of the hopper space 101.

Figure 26:
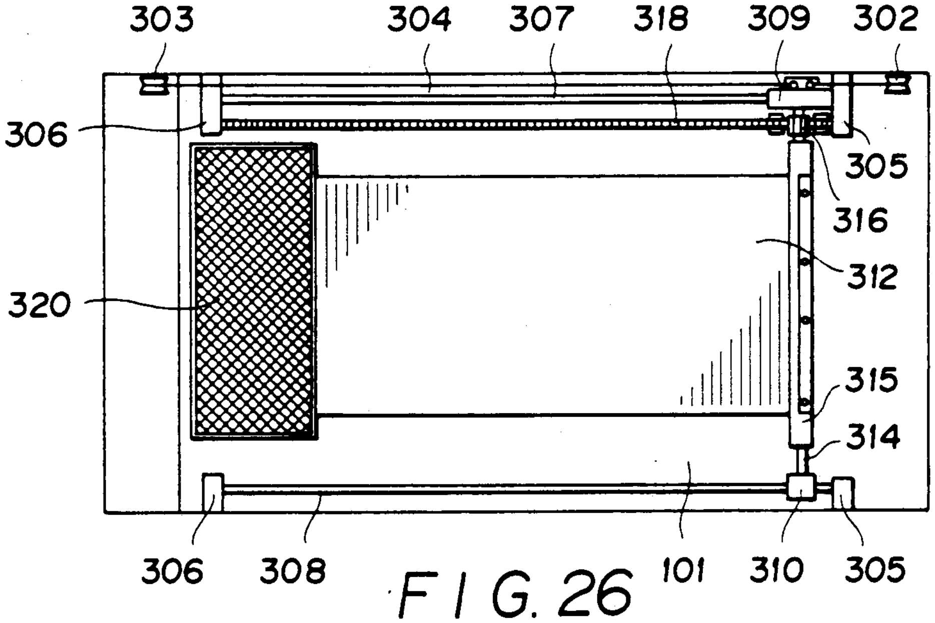
FIG. 26 is a plan view of the removing apparatus for paper sheets, fold sections, paper dust, etc., in a rotary press in accordance with the seventh embodiment of the present invention.
Figure 27:
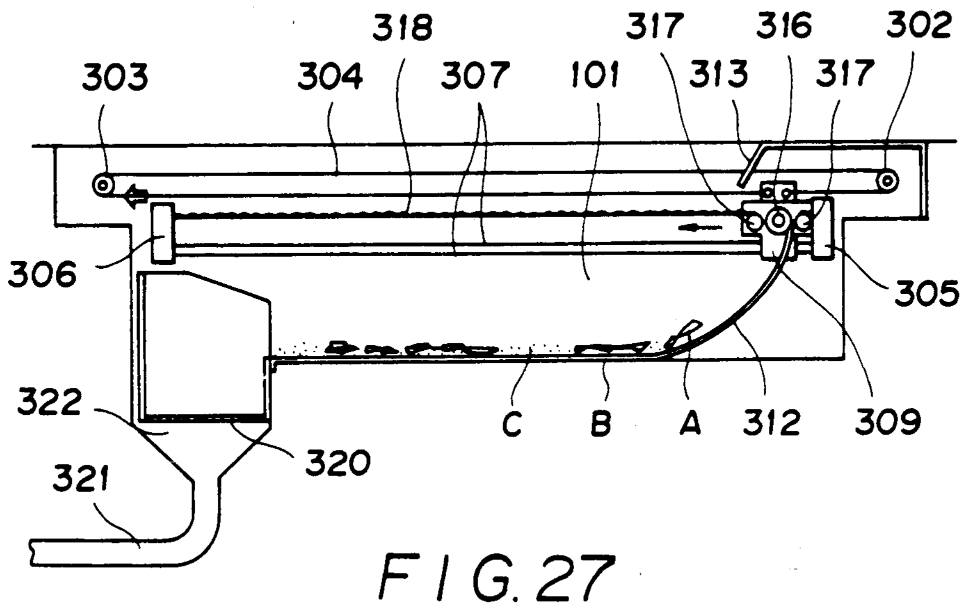
FIGS. 27 and 28 are sectional front views showing the operation of the removing apparatus for paper sheets, fold sections, paper dust, etc., in a rotary press in the seventh embodiment of the present invention.
Figure 28:
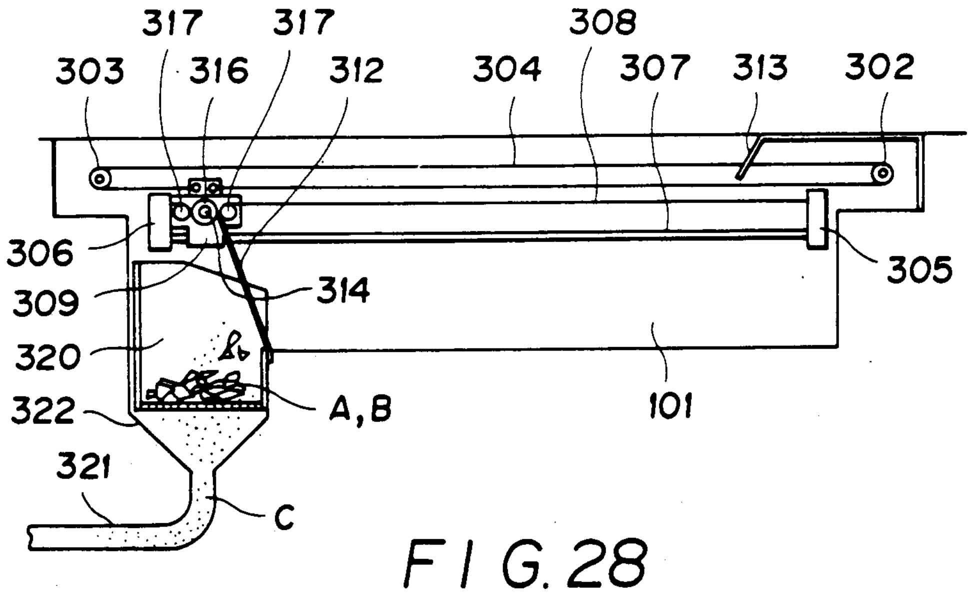

In the seventh embodiment, a mesh bottom bucket 320 having a mesh-like bottom is used in place of the bucket 319 in the sixth embodiment as shown in FIGS. 26 and 27, and the bucket disposition cavity is formed as a dust collection hopper 322 to the bottom of which a suction pipe 321 is connected. This suction pipe 321 is connected to a vacuum dust collection apparatus not shown in the drawing, and the rest of the constructions are the same as those of the sixth embodiment.

The operation and function of the removing apparatus for paper sheets, fold sections, paper dust, etc., in accordance with the fifth to seventh embodiments described above will now be explained.

In the fifth embodiment, first of all, the sliding blocks 309, 310 are normally positioned at the upstream end (the right end in the drawing) and the flexible sheet 312 is expanded on the bottom of the hopper space 101. Large paper sheets A and fold sections B and small paper dust C falling from the folding apparatus of the rotary press into the hopper space accumulate on the flexible sheet 312 (see FIG. 19). The paper sheets A, the fold section B and the paper dust C falling around the hopper space 101 fall onto at least the flexible sheet 312 without staying due to the canopy-like slope plate 313.

When the paper sheets A, the fold sections B and the paper dust C that accumulate are recovered, the endless rope 304 is moved manually so that the lower travelling side of the endless rope 304 travels from the upstream side to the downstream side (or the upper travelling side moves from the downstream side to the upstream side). Then, the sliding blocks 309, 310 slide while being guided by the guide wires 307, 308 and move to the downstream side together with the frame rod 311. Accordingly, the flexible sheet 312 is folded back while winding and gathering the accumulated paper plates A, fold sections B and paper dust C (see FIG. 20).

Figure 21:
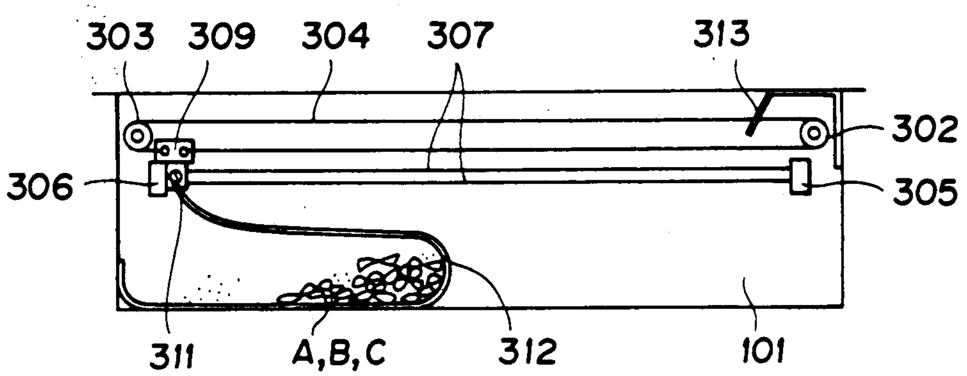

As the travel of the endless rope 304 or in other words, the movement of the sliding block 309, proceeds, the flexible sheet 312 becomes bag-like, then gathers and wraps the paper sheets A, the fold sections B and the paper dust C to the downstream side and the sliding blocks 309, 310 strike the brackets 306, 306 on the downstream side (see FIG. 21).

The paper sheets A, the fold sections B and the paper dust C that are gathered to the downstream end on the flexible sheet 312 can be easily recovered and removed by suitable means.

After the removing work of the paper sheets A, the fold sections B and the paper dust C is complete, the endless rope 304 is move in such a manner that the lower travelling side of the endless rope 304 moves from the downstream side to the upstream side (or the upper travelling side moves from the downstream side to the upstream side) until the sliding blocks 309, 310 strike the brackets 305, 305 on the upstream side. In this manner the flexible sheet 312 returns to the original state where it is expanded on the bottom surface of the hopper space 101 (see FIG. 19).

In the sixth embodiment, first of all, the sliding blocks 309, 310 are positioned normally at the upstream end (at the right end in the drawing) in the same way as in the fifth embodiment and the flexible sheet 312 is expanded on the bottom surface of the hopper space 101. Large paper sheets A and fold sections B and small paper dust C falling from the folding apparatus of the rotary press into the hopper space 101 accumulate on the flexible sheet 312 (see FIG. 23).

When these accumulating paper sheets A, fold sections B and paper dust C are recovered and removed, the endless rope 304 is moved manually so that the lower travelling side of the endless rope 304 moves from the upstream side to the downstream side (or the upper travelling side moves from the downstream side to the upstream side). Then, the sliding blocks 309, 310 slide while being guided by the guide wires 307, 308 and move to the downstream side with the rotary shaft 314. Accordingly the timing pulley 316 whose lower periphery meshes with the timing belt 318 rotates counter-clockwise in FIG. 23. As a result, the take-up roller 315 rotate counter-clockwise together with the rotary shaft 314 and moves to the downstream side while winding thereinto the flexible sheet 312.

Figure 24:
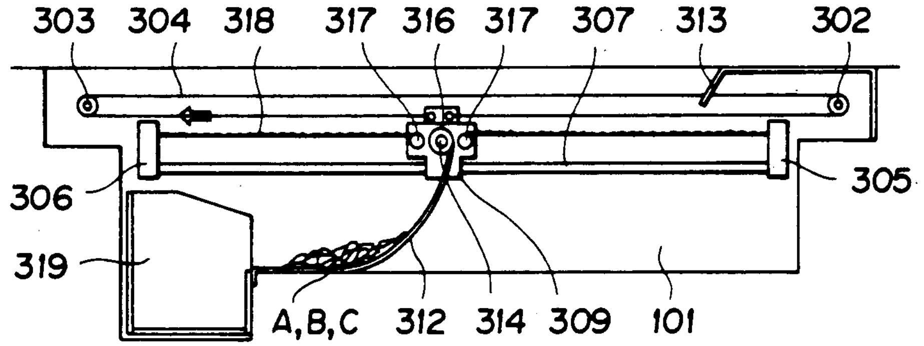
Figure 25:
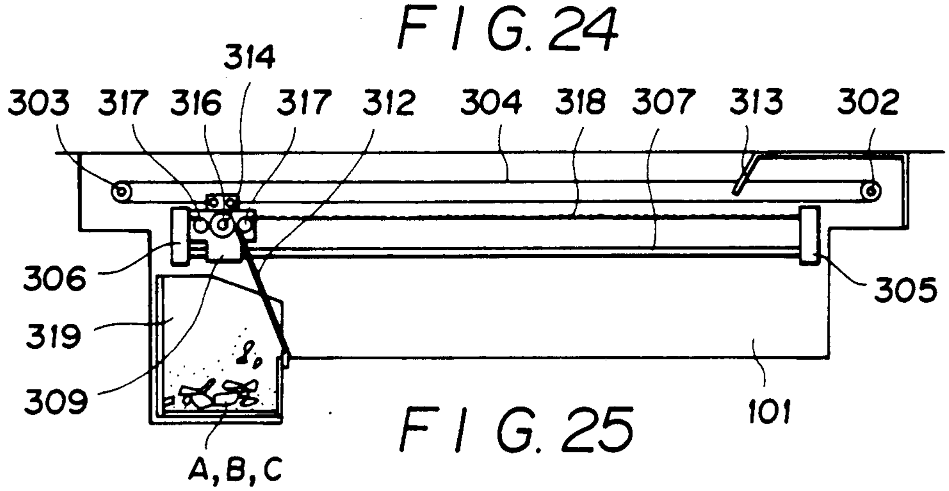

Accordingly, the paper sheets A, the fold sections B and the paper dust C that accumulate on the flexible sheet 312 are gradually gathered to the downstream side (see FIG. 24).

When the sliding blocks 309, 310 move until they strike the brackets 306, 306 on the downstream side, the take-up roller 315 is positioned at a position ahead of the fixed edge of the flexible sheet 312 on its downstream side and the flexible sheet 312 is wound on the take-up roller 315 without any slack. Accordingly, the paper sheets A, the fold sections B and the paper dust C gathered to the downstream end on the flexible sheet 312 are discharged into the bucket 319 (see FIG. 25).

When recovery/discharge of the paper sheets A, the fold sections B and the paper dust C is complete, the endless rope 304 is moved so that its lower travelling side moves from the downstream side to the upstream side (or its upper travelling side moves from the upstream side to the downstream side) until the sliding blocks 309, 310 strike the brackets 305, 305 on the upstream side. Then, the operation opposite to the operation described above is carried out and eventually, the take-up roller 315 rotate counter-clockwise with the rotary shaft 314 and moves to the downstream side while rewinding the flexible sheet 312. Thus the flexible sheet 312 returns to the original state (see FIG. 23) where it is expanded on the bottom surface of the hopper space 101.

The paper sheets A, fold sections B and paper dust C that accumulate inside the bucket 319 are discarded by taking out the bucket 319.from the bucket disposition cavity.

In the seventh embodiment, the paper sheets A, the fold section B and the paper dust C that accumulate on the flexible sheet 312 are discharged into the mesh bottom bucket 320 in the same way in the sixth embodiment. Then, the large paper sheets A and fold sections B are received by the mesh-like bottom of the mesh bottom bucket 320 and stay there while the small dust C passes through the mesh of the mesh-like bottom, falls down to the bottom of the dust collection hopper 322 is sucked and discharged by the vacuum dust collector, not shown in the drawings, through the suction pipe 321 (see FIG. 28). The paper sheets A and the fold sections B staying inside the mesh bottom bucket 320 are discarded in the same way as in the sixth embodiment.

The movement of the sliding blocks 309, 310 in the fifth to seventh embodiments described above or in other words, the travel of the endless rope 304, is effected by the manual operation. However, automation can be accomplished by use of suitable driving means and by using the bracket 305 on the upstream side as a stop position sensor fitting member and the bracket 306 on the downstream side as an inversion position sensor fitting member instead of using them merely as stoppers. The sensors may be of a known type and their fitting positions can be selected suitably besides the brackets 305, 306 depending on the moving range of the sliding blocks 309, 310.

Examples of the driving means described above include a motor which drives and rotates either directly or indirectly any of the pullies 302 (303) or the rotary shaft 314.

Though the moving mechanism for the sliding blocks 309, 310 is the endless rope-pulley mechanism in the fifth to the seventh embodiments, it may be a fluid pressure cylinder mechanism.

In accordance with the removing apparatus for paper sheets, fold sections, paper dust, etc., in accordance with the present invention, dust collection of paper dust falling and deposited into the hopper below the folding apparatus having a narrow and limited space, that has not been made completely or only inefficiently in the prior art apparatuses, can be made easily and automatically without stopping the operation of the rotary press, and removal of the paper sheets and fold sections, that has been difficult in the conventional dust collectors, can be made simultaneously.

Accordingly, the present invention can eliminate the troubles of the operators for the maintenance and cleaning of the rotary press, particularly the folding apparatus, and can prolong the long term operation of the rotary press.

What is claimed is:

1. A removing apparatus for paper sheets, fold sections, paper dust, etc., in a rotary press to be disposed in a falling and accumulating region of paper sheets, fold sections, paper dust, etc., of said rotary press, comprising:

(a) a hopper space which defines an upper space portion and a lower space portion and into which the paper sheets, fold sections, paper dust, etc., of said rotary press fall;

(b) a longitudinal grid forming the bottom surface of said upper space;

(c) an upper frame member disposed in said upper space portion and capable of reciprocating in the discharging direction of the paper sheets and the fold sections;

(d) a lower frame member disposed in said lower space portion and capable of reciprocating in the discharging direction of the paper dust;

(e) a plurality of hooks disposed on said upper frame member with gaps between them in the reciprocating direction, being rocked by driving means in the reciprocating direction, and having the tip thereof capable of coming close to the upper surface of said longitudinal grid or projecting into said longitudinal grid; and (f) a plurality of scraping plates disposed on said lower frame member with gaps between them in the reciprocating direction, being rocked by driving means in the reciprocating direction and having the tip thereof capable of coming close to, or coming into contact with, the dust collection surface as the bottom surface of said lower space portion.

* * * * *